United States Patent
Klein et al.

(10) Patent No.: US 10,981,685 B2
(45) Date of Patent: Apr. 20, 2021

(54) CONTAINER HANDLING PLANT AND METHOD FOR A CONTAINER HANDLING PLANT WITH SIGNALS FOR PLANNED STATES

(71) Applicant: Krones AG, Neutraubling (DE)

(72) Inventors: Robert Klein, Barbing (DE); Wolfgang Hahn, Neutraubling (DE); Timo Pronold, Wiesent (DE); Markus Zoelfl, Metten/Berg (DE)

(73) Assignee: Krones AG, Neutraubling (DE)

( * ) Notice: Subject to any disclaimer, the term of this patent is extended or adjusted under 35 U.S.C. 154(b) by 207 days.

(21) Appl. No.: 16/310,482

(22) PCT Filed: Jun. 29, 2017

(86) PCT No.: PCT/EP2017/066231
§ 371 (c)(1),
(2) Date: Dec. 17, 2018

(87) PCT Pub. No.: WO2018/036692
PCT Pub. Date: Mar. 1, 2018

(65) Prior Publication Data
US 2019/0248529 A1 Aug. 15, 2019

(30) Foreign Application Priority Data

Aug. 24, 2016 (DE) ...................... 10 2016 115 694.9

(51) Int. Cl.
*B65B 57/18* (2006.01)
*B67C 3/00* (2006.01)
(Continued)

(52) U.S. Cl.
CPC ............ *B65B 57/18* (2013.01); *B65B 59/001* (2019.05); *B65B 59/003* (2019.05);
(Continued)

(58) Field of Classification Search
CPC  B67C 3/001; B67C 3/007; B67C 7/00; B65B 59/001; B65B 59/003; B65B 57/18
(Continued)

(56) References Cited

U.S. PATENT DOCUMENTS 8,265,781 B2 * 9/2012 Rannsauer et al. .......................... G05B 19/41885
700/83
8,651,260 B2 * 2/2014 Hasler et al. ........... B67C 3/007
198/341.06

(Continued)

FOREIGN PATENT DOCUMENTS

| CN | 101573671 A | 11/2009 |
|---|---|---|
| CN | 103052567 A | 4/2013 |

(Continued)

OTHER PUBLICATIONS

International Preliminary Report on Patentability and Translation of Written Opinion of the International Searching Authority dated Feb. 26, 2019 for corresponding International Application No. PCT/EP2017/066231.

(Continued)

*Primary Examiner* — Stephen F. Gerrity
(74) *Attorney, Agent, or Firm* — Walter Haverfield LLP; Sean F. Mellino (57) ABSTRACT

A container handling plant and a method for a container handling plant are shown. The container handling plant comprises at least one container handling machine for handling containers, wherein at least one container handling machine comprises a type preselection memory in which different types are preselectable for a handling to be performed by the container handling machine, at least one output device positioned at the at least one container handling machine for outputting an audio signal and/or an optical signal, and a control device configured to control the (Continued)

at least one output device such that the output device acoustically outputs a predetermined audio signal made of tone sequences comprising at least two different tones and/or optically outputs an optical signal, if due to the type preselected in the type preselection memory a change of a type or a refilling for the preselected type at the container handling machine is scheduled in the future at the end of a predetermined time period.

10 Claims, 4 Drawing Sheets

(51) Int. Cl.
| | | |
|---|---|---|
| *B67C 7/00* | (2006.01) | |
| *B67C 3/22* | (2006.01) | |
| *B65B 21/00* | (2006.01) | |
| *B65B 3/00* | (2006.01) | |
| *B65B 65/00* | (2006.01) | |
| *B65B 59/00* | (2006.01) | |
| *G06Q 10/00* | (2012.01) | |
| *G05B 19/418* | (2006.01) | |

(52) U.S. Cl.
CPC ............ *B65B 65/003* (2013.01); *B67C 3/007* (2013.01); *B67C 7/00* (2013.01); *G06Q 10/00* (2013.01); *B65B 3/00* (2013.01); *B65B 21/00* (2013.01); *B67C 2003/227* (2013.01); *G05B 19/41865* (2013.01); *G06Q 10/20* (2013.01); *Y02P 90/02* (2015.11)

(58) Field of Classification Search
USPC ............................................ 53/52, 507, 508
See application file for complete search history.

(56) References Cited

U.S. PATENT DOCUMENTS

| | | | | |
|---|---|---|---|---|
| 8,996,158 | B2* | 3/2015 | Hahn et al. .......... | G05B 19/409 700/225 |
| 9,375,878 | B2* | 6/2016 | Hahn et al. ............. | B67C 3/007 |
| 9,383,743 | B2* | 7/2016 | Hahn ...................... | B29C 33/30 |
| 10,252,899 | B2* | 4/2019 | Sauspreischkies et al. ................. B67C 3/007 | |
| 10,710,275 | B2* | 7/2020 | Winzinger ............ | B65B 59/001 |
| 2005/0210832 | A1* | 9/2005 | Tassin et al. ......... | B65B 59/003 53/396 |
| 2010/0016997 | A1 | 1/2010 | Ramsauer et al. | |
| 2011/0040403 | A1* | 2/2011 | Langanki et al. . | B65G 21/2072 700/228 |
| 2011/0082582 | A1 | 4/2011 | Hahn et al. | |
| 2011/0118868 | A1* | 5/2011 | Herrmann et al. ..... | B67C 3/007 700/214 |
| 2011/0132720 | A1 | 6/2011 | Hasler et al. | |
| 2012/0311962 | A1* | 12/2012 | Hahn et al. ............. | B67C 3/007 53/281 |
| 2013/0211575 | A1 | 8/2013 | Hahn | |
| 2013/0231772 | A1 | 9/2013 | Hahn et al. | |
| 2014/0305076 | A1 | 10/2014 | Winzinger | |
| 2015/0220071 | A1* | 8/2015 | Hahn et al. ............ | G05B 15/02 700/90 |
| 2015/0248826 | A1* | 9/2015 | Hahn et al. .......... | G02B 27/017 340/539.11 |
| 2016/0362202 | A1* | 12/2016 | Hawighorst et al. ........................ | B65B 43/465 |

FOREIGN PATENT DOCUMENTS

| | | |
|---|---|---|
| DE | 102006049981 A1 | 4/2008 |
| DE | 102006051533 A1 | 4/2008 |
| DE | 102011050724 A1 | 12/2012 |
| DE | 102011054890 A1 | 5/2013 |
| DE | 102008037708 B4 | 5/2014 |
| EP | 2306254 A1 | 4/2011 |
| WO | 2008/049518 A1 | 5/2008 |
| WO | 2012/016771 A1 | 2/2012 |

OTHER PUBLICATIONS

International Search Report from the European Patent Office dated Oct. 6, 2017 for corresponding International Application No. PCT/EP2017/066231.
Written Opinion from the European Patent Office dated Oct. 6, 2017 for corresponding International Application No. PCT/EP2017/066231.
Chinese Patent Office, Office Action dated Dec. 3, 2020 for CN201780006161 (foreign counterpart to present application).
Reply to Office Action dated Dec. 3, 2020 for CN201780006161 (foreign counterpart to present application).
English translation of suggested arguments for Reply to Office Action dated Dec. 3, 2020 for CN201780006161 (foreign counterpart to present application).
Chinese Patent Office, Office Action dated Jul. 24, 2020 for CN201780006161 (foreign counterpart to present application).
Reply to Office Action dated Jul. 24, 2020 for CN201780006161 (foreign caunterpart to present application).
English translation of suggested arguments for Repiy to Office Action dated Jul. 24, 2020 for CN201780006161 (foreign counterpart to present application).

* cited by examiner

CONTAINER HANDLING PLANT AND METHOD FOR A CONTAINER HANDLING PLANT WITH SIGNALS FOR PLANNED STATES

CROSS-REFERENCE TO RELATED APPLICATIONS

This application a 371 National Stage application of International Application. No. PCT/EP2017/066231 filed on Jun. 29, 2017, which claims foreign priority to German (DE) Application Serial No. 10 2016 115 694.9 filed on Aug. 24, 2016, the contents of both of which are incorporated herein by reference in their entireties.

BACKGROUND OF THE INVENTION

Field of the Invention

The present invention relates to a container handling plant and a method for a container handling plant with signals, such as audio signals and/or optical signals, for planned states.

Description of the Prior Art

A container handling plant is used, for example, in the beverage industry for the production and or filling and/or packaging of containers: The container handling plant may comprise at least one container handling machine, such as a blow molding machine and/or a cleaning machine and/or a filling machine and/or a labeling machine and/or a packaging machine. Containers are in particular cans, glass bottles or plastic bottles. The containers are transported by a conveying device between the individual machines of the container handling plant.

It is possible that the container handling plant is constructed for the handling of various containers, such as containers having a capacity of 0.33 or 0.5 or 1 liter, etc., or for filling different beverages in one and the same container type or for packaging the containers in a bundle of two, four or six, etc. containers and/or with different packaging materials such as films, cardboard, etc. Depending on the container, beverage or also bundle, another label or other equipment is to be attached to the container. Thus, during operation of the container handling plant, different plant states occur, to which the container handling plant is to be set or to be converted from a previous state, respectively.

In general, it is advantageous, if the setting or conversion times for the container handling plant can be kept as short as possible.

SUMMARY OF THE PRESENT INVENTION

It is therefore an object of the present invention to provide a container handling plant and a method with which the aforementioned problems can be solved. In particular, a container handling plant and a method for a container handling plant are to be provided, in which the setting or conversion times for the container handling plant are kept as short as possible.

The object is achieved by a container handling plant. The container handling plant has at least one container handling machine for handling and/or treating containers, wherein at least one container handling machine comprises a type preselection memory in which different types are preselectable for a handling to be performed by the container handling machine, at least one output device positioned at the at least one container handling machine for outputting an audio signal and/or an optical signal, and a control device configured to control the at least one output device such that the output device acoustically outputs a predetermined audio signal made of tone sequences comprising at least two different tones and/or optically outputs an optical signal, if due to the type preselected in the type preselection memory a change of a type or a refilling for the preselected type at the container handling machine is scheduled in the future at the end of a predetermined time period.

With the container handling plant, it can be determined simply and reliably on the basis of the audio signals by at least one operator that a planned state is due at the end of a predetermined, in particular predicted, time duration or time. Such a planned state may, in particular, be a conversion of the container handling plant from handling containers with a capacity of, for example, 1 liter to handling containers with a capacity of 0.33 liter. However, any other planned states are conceivable. As a result, the at least one operator is reminded in due time of the planned state, so that the at least one operator can prepare himself in good time for the planned state and prepare the tasks to be done in due time. Waiting times because of late execution of the activities required by the planned state, for example a late start of the re-setting or conversion of the plant to another product, can be prevented. As a result, the setting or conversion times for the container handling plant may be kept as short as possible. Consequently, the availability of the container handling plant is increased, whereby the cost of the container handling plant can be reduced.

With the container handling plant, drawing a distinction between the audio signals for planned states and audio signals for interference or danger is particularly simple and safe and, thus, very advantageous possible. The same applies to drawing the distinction between optical signals for planned states and optical signals for disturbances or dangers. In addition, the audio signals and or optical signal are universal and can be understood independently of the language skills of the operator of the plant. This is a great advantage in this day and age, where often operators talking different native languages are working on a container handling plant.

Advantageous further embodiments of the container handling plant are specified below.

Possibly, the predetermined audio signal is a melody. Alternatively, the predetermined audio signal may be a melody combined with a speech sequence. Herein, the speech sequence may be a spoken speech sequence. Additionally or alternatively, the optical signal may be a constant light or a flashing or turning off of the output device.

It is also possible that the predetermined audio signal and/or the optical signal are/is different for each planned state of a change of a type or refilling or an operator intervention/setup operation for the preselected type of the container handling plant. Additionally or alternatively, the output device may be configured to periodically repeat the predetermined audio signal and/or the optical signal, wherein the output of the predetermined audio signal and/or the optical signal comprises a code comprising the progressing time with respect to the change of a type or refilling for the preselected type.

Preferably, each container handling machine having a type preselection memory is assigned an output device or an output device is allocated to each container handling machine having a type preselection memory, wherein the output device of a container handling machine is operable independent of an output device of another container handling machine.

According to one kind of implementation, the container handling plant comprises a first container handling machine and another container handling machine positioned downstream of the first container handling machine in the conveying direction of the containers, and wherein the control device is configured to controlling an output device positioned at the other container handling machine such that the output device outputs the predetermined audio signal and/or the optical signal when, due to the type preselected in the type preselection memory, a change of the type or a refill of the preselected type on the first container handling machine is scheduled in the future at the end of a predetermined time period.

It is also conceivable that the container handling plant further comprises a detecting device configured and positioned to detect at least one actual state of an operating variable in operation of the at least one container handling machine, wherein the actual state of the operating variable is a measurement for a time period or a residual amount still to be filled, at the end of which time period is scheduled a start or the end of a predetermined operation of the at least one container handling machine, wherein the control device is configured to controlling the at least one output device such that the output device outputs an audio signal from tone sequences comprising at least two different tones and/or the optical signal, when the detecting device detects a predetermined actual state of the at least one actual state.

Herein, the start or the end of a predetermined operation of the at least one container handling machine may be the start or the end of production with the container handling plant. Alternatively, the start or the end of a predetermined operation of the at least one container handling machine may be the start or the end of a conversion of the at least one container handling machine from the production of a first product to a second product. Alternatively, the start or the end of a predetermined operation of the at least one container handling machine may be the start or the end of a cleaning process with the at least one container handling machine. As yet another alternative, the start of a process for emptying the machine or the plant, for example, on the mixer to mix a product, may signal the end of the production and the beginning of the next production.

In one kind of implementation, the container handling plant can also have a conveying device for conveying containers to the at least one container handling machine or away from the at least one container handling machine. Additionally or alternatively, in a further kind of implementation, the container handling plant can additionally have a conveying device for conveying containers from a first container handling machine to a third container handling machine bypassing a second container handling machine, which is positioned between the first and third container handling machines, if a type associated to bypassing is preselected in the type preselection memory of the first container handling machine. Additionally or alternatively, the at least one container handling machine may comprise a blow molding machine and/or a cleaning machine and/or a heat handling machine and/or a filling machine and/or an equipment machine and/or a packaging machine and/or a palletizing machine.

The object is further achieved by a method for a container handling plant, wherein the container handling plant comprises at least one container handling machine for handling containers, at least one output device positioned at the at least one container handling machine, and a control device, wherein the at least one container handling machine has a type preselection memory in which different types for a handling are preselectable, which are to be performed by the container handling machine, and wherein the method comprises the steps of performing a handling of containers with the at least one container handling machine, in which a type is preselected out of different types of the type preselection memory and for which a handling is to be performed by the container handling machine, controlling, by a control device, the at least one output device such that the output device outputs a predetermined audio signal made of tone sequences comprising at least two different tones and/or optically outputs an optical signal, if due to the type preselected in the type preselection memory a change of a type or a refilling for the preselected type at the container handling machine is scheduled in the future at the end of a predetermined time period, and acoustically outputting, by at least one output device, the predetermined audio signal and/or optically outputting, by at least one output device, an optical signal.

The method achieves the same advantages as previously mentioned with respect to the container handling plant.

Further possible implementations of the invention also include not explicitly mentioned combinations of features or implementations described above or below with regard to the embodiments. The person skilled in the art will also add individual aspects as improvements or additions to the respective basic form of the invention.

BRIEF DESCRIPTION OF THE DRAWINGS

The invention is described below with reference to the accompanying drawings and on the basis of an exemplary embodiment.

In the figures, identical or functionally identical elements, unless otherwise indicated, are provided with the same reference numerals.

DETAILED DESCRIPTION OF THE PRESENT INVENTION

Figure 1:
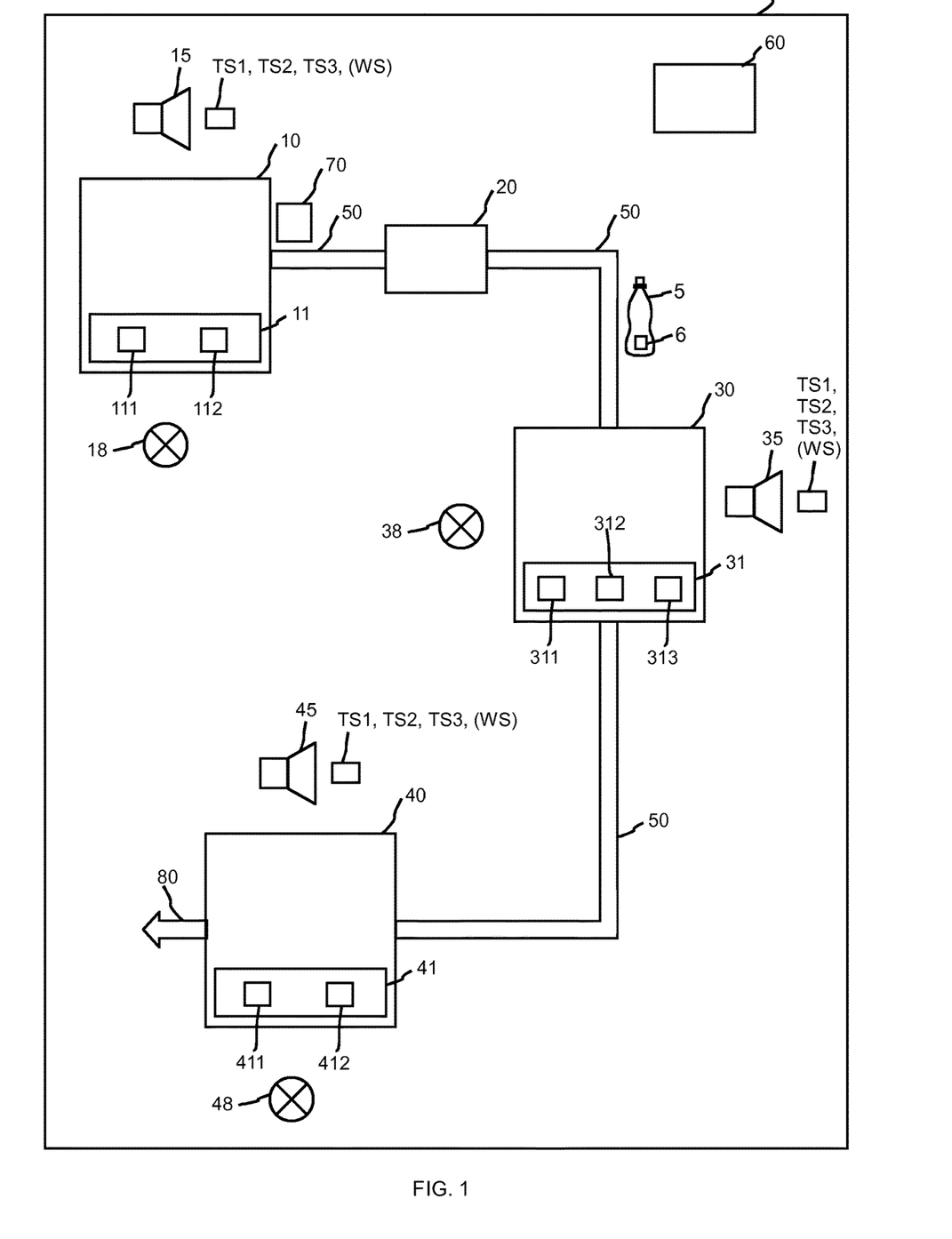
FIG. 1 shows a schematic block diagram of a container handling plant according to a first embodiment.

FIG. 1 very schematically shows a container handling plant 1 for handling and/or treating containers 5. The containers 5 can be either finished containers, such as glass or plastic bottles, cans, etc., or preforms. In the container handling plant 1 in FIG. 1, the container 5 may be made of the preforms. The preforms are made of plastic, such as polyethylene terephthalate (PET), polypropylene (PP), etc., and are also containers, albeit unfinished containers or containers untreated by the container handling plant 1, The finished containers 5 are in FIG. 1 as an example bottles in which a product can be filled. The product may in particular be a beverage, a cleaning agent, etc. The containers 5 can be provided with a label 6 in the container handling plant 1.

In FIG. 1, the container handling plant 1 comprises a first container handling machine 10, which has a type preselection memory 11 and in which a first output device 15 for outputting a first to third predetermined audio signal TS1, TS2, TS3 and possibly also a warning signal WS for a first operator 18 is positioned, a second container handling machine 20, a third container handling machine 30 comprising a type preselection memory 31 and in which a second output device 35 for outputting the first predetermined audio signal TS1 for a second operator 38 is positioned, a fourth container handling machine 40 comprising a type preselection memory 41 and in which a third output device 45 for outputting the first predetermined audio signal TS1 for a third operator 48 is positioned, as well as conveying devices 50, a control device 60 and a detecting device 70. At a position of the container handling plant 1, which is marked with an arrow 80, the containers 5 are discharged from the container handling plant 1.

The first container handling machine 10 may be a filling machine for filling the containers 5 with the product, for example, which machine is combined with a labeling machine for labeling the containers 5. It is also possible that the first container handling machine 10 also has a stretch blow molding machine with heating device for producing plastic containers from preforms as a container 5. It is also possible to combine a stretch blow molding machine with an equipment machine, such as a labeling machine and/or printing machine, and a filling machine or any other implementation of a block. Each individual machine preferably has a type preselection memory in such a block. The block preferably, has at least one sound signal generator or audio signal generator as the output device 15.

The second container handling machine 20 is connected downstream of the first container handling machine 10 in the conveying direction of the container 5. The second container handling machine 20 may include, for example, one or more product handling machines for pasteurizing, cooling or reheating the containers 5 treated, for example filled, by the first container handling machine 10.

The third container handling machine 30 is connected downstream of the second container handling machine 20 in the conveying direction of the containers 5. The third container handling machine 30 may, for example, be a packaging machine for packaging the containers 5 in particular bundles with a certain number of containers 5, for example six containers 5.

The fourth container handling machine 40 is connected downstream of the third container handling machine 30 in the conveying direction of the containers 5. The fourth container handling machine 40 may be, for example, a palletizer for packaging the bundles on pallets.

In FIG. 1, as an example, the first, third and fourth container handling machines 10, 30, 40 have a type preselection memory 11, 31, 41 in which different types for a handling to be performed by the associated container handling machine 10, 30, 40 are pre-selectable. Of course, the second container handling machine 10, 30, 40 may have a type preselection memory. In the type preselection memory 11, at least two, preferably several different types 111, 112 are pre-selectable, such as a bottle with a capacity of 0.5 l or a bottle with a capacity of 1.0 l, or 1.5 l, etc. and/or the product to be filled into the containers 5, wherein the labels, in particular the wrap-around label or the breast and belly label, or only the belly label, or the labeling or printing of the labels is different in each case. In the type preselection memory 31, three different types 311, 312, 313 are preselectable, such as a bundle having six bottles, a bundle having two bottles, a special protective film for the container. In the type preselection memory 31, two different types 411, 412 are preselected, such as a EURO pallet or a non-EURO pallet.

The conveying devices 50 convey the containers 5 between the individual container handling machines 10, 20, 30, 40 from the first container handling machine 10 to the second container handling machine 20, etc., so that the containers 5 are discharged from the container handling plant 1 in the direction of the arrow 80.

The control device 60 controls the first to fourth container handling machines 10, 20, 30, 40 and the conveying devices 50. In addition, the control device 60 controls the output devices 15, 35, 45 together or independently of each other. This is illustrated schematically in FIG. 2 with the aid of a flowchart of a method.

Figure 2:
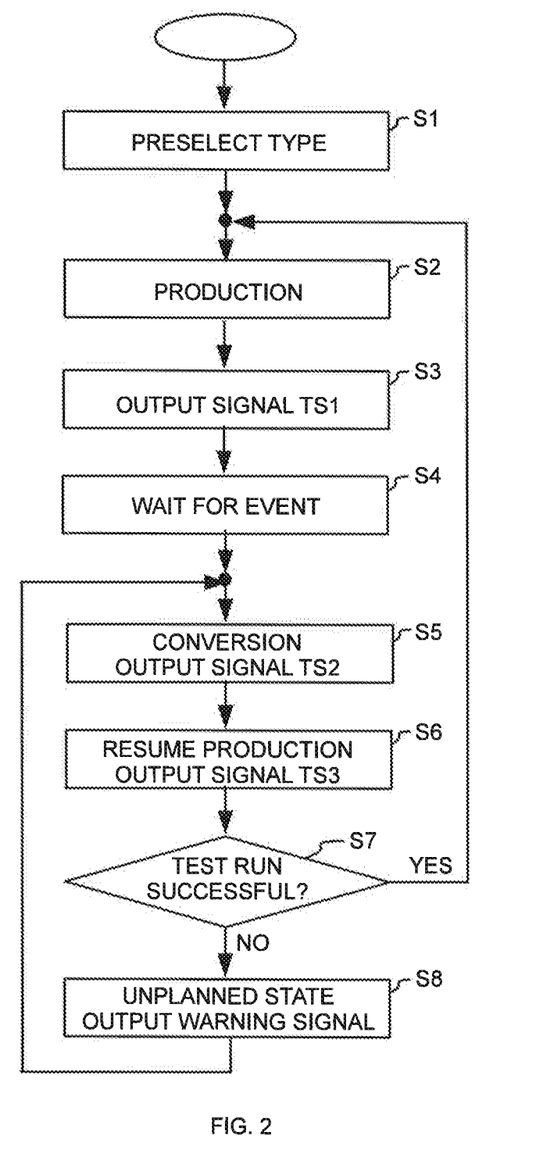
FIG. 2 shows a flowchart of a method for a container handling plant according to the first embodiment.

The method according to FIG. 2 can be carried out when the container handling plant 1 or at minimum at least one of the container handling machines 10, 30, 40 is switched on. Herein, the steps S1 to S8 described below can be performed by the first container handling machine 10. In contrast, only the steps S1 to S4 can be performed completely by the third and/or fourth container handling machine(s) 30, 40. If necessary, the third and or fourth container handling machine(s) 30, 40 may also execute the steps S5 and S6 without outputting the predetermined audio signals TS2 and TS3.

According to FIG. 2, at least one of the types 111, 112, 311, 312, 313, 411, 412 for the respective container handling machine 10, 30, 40 is preselected after the start of the method in a step S1. In addition, the second container handling machine 20 is switched on and set up by at least one of the respective operators 18, 38, 48, possibly under the guidance of, for example, optical or also acoustic outputs of the control device 60. Thereafter, the flow proceeds to a step S2.

In the step S2, the container handling plant 1 performs a production. Thus, with the container handling plant 1, a handling of containers 5 is performed, wherein the handling is performed with at least one of the container handling machines 10, 30, 40. In this case, the container handling plant 1 is controlled by the control device 60. Thereafter, the flow proceeds to a step S3.

In the step S3, the control device 60 controls during production at least one of the output devices 15, 35, 45, after determining, for example by means of the detecting device 70, that a change of the preselected type 111, 112, 311, 312, 313, 411, 412 or refilling for the preselected type 111, 112, 311, 312, 313, 411, 412 is scheduled within a short time. Herein, within a short time will be understood that the change or refilling is scheduled in the future, for example in a predetermined time period, in particular approximately 5 minutes or 8 minutes, etc. The predetermined time period has to be previously predicted or estimated or stopped or calculated so that the predetermined time period is also, in particular, a predicted time period, Herein, the control device 60 controls at least one of the output devices 15, 35, 45 in such a way that the actuated output device (s) 15, 35, 45 acoustically output(s) a first predetermined audio signal TS1 from tone sequences with at least two different tones. As a result, the correspondingly actuated at least one output device 15, 35, 45 outputs the first predetermined audio signal TS1 acoustically. The first predetermined audio signal TS1 may be a melody. In addition, the melody of the first predetermined audio signal TS1 may also be combined with a speech sequence. Herein, the speech sequence may also be a spoken speech sequence. Thereby, the respective operator 18, 38, 48 can easily and surely distinguish the first predetermined audio signal TS1 from an interfering signal or warning signal which is a buzzer or an acoustic warn signal of a horn. The first predetermined audio signal TS1 signals to the operator 18, 38, 48 that he should prepare himself for the setup or conversion of the type 111, 112, 311, 312, 313, 411, 412. Thereafter, the flow proceeds to a step S4.

In the step S4, the controller 60 waits until the predetermined time period elapsed or a scheduled event occurred, as described later with respect to a modification of the embodiment. When the predetermined time period elapsed, the flow proceeds to a step S5.

In the step S5, the control device 60 activates the container handling plant 1 such that the production is ended and the conversion of the container handling plant 1 begins. Herein, the operator can be guided by the control device 60 by, for example, optical and/or acoustic outputs through the steps to be carried out for the conversion. However, the type preselection memory 11, 31, 41 can be filled or changed not only by an operator 18, 38, 48 but also at least partially by a higher-level system (line management system). In addition, the control device 60 also controls the at least one of the output devices 15, 35, 45 in such a way that the actuated output device(s) 15, 35, 45 acoustically output(s) a second predetermined audio signal TS2 having tone sequences with at least two different tones. Consequently, the correspondingly actuated at least one output device 15, 35, 45 outputs the second predetermined audio signal TS2 acoustically. The second predetermined audio signal TS2 preferably differs, in particular in the tone sequence, from the first predetermined audio signal TS1. As a result, the at least one operator 18, 38, 48 of the container handling plant 1 can identify in which state the container handling plant 1 is currently. For example, the second predetermined audio signal TS2 signals to the operator 18 via the output device 15 that the operator 18 should immediately start a setup of the container handling machine 10. In addition, the second predetermined audio signal TS2 is an indication to the operator 38 of the next container handling machine 20 or 30, such as the packaging machine, that is nearby that the last containers 5 will soon arrive at the packaging machine, the container handling machine 30. Therefore, the operator 38 can empty the container handling machine 30 (external setup) and then convert (internal setup), for example, to the next type 111, 112, 311, 312, 313, 411, 412. However, with the output device 35 at the container handling machine 30, such as the packaging machine, the first predetermined audio signal TS1 may be output when the operator 38 can manually empty the container handling machine 30 by a manual operation. As a result, a signal is additionally given to the operator 38 to prepare himself for setting up the container handling machine 30. If the conversion of the container handling plant 1 is completed, the flow proceeds to a step S6.

In the step S6, the control device 60 controls the container handling plant 1 such that the production is resumed after the conversion of the container handling plant 1. Herein, the control device 60 also actuates the at least one of the output devices 15, 35, 45 such that the actuated output device(s) 15, 35, 45 acoustically output(s) a third predetermined audio signal TS3 having tone sequences with at least two different tones. As a result, the correspondingly actuated at least one output device(s) 15, 35, 45 acoustically output(s) the third predetermined audio signal TS3. Also the third predetermined audio signal TS3 preferably differs, in particular in the tone sequence, from the first and second predetermined audio signals TS1, TS2. Thereby, the respective operator 18, 38, 48 of the container handling plant 1 can identify in which state the container handling plant 1 is currently. Thereafter, the flow proceeds to a step S7.

In the step S7, the controller 60 examines whether a test run of at least one conversed container handling machine 10, 30, 40 was successful or not. In case the test nm was successful, the flow returns to step S2. In case the test run was unsuccessful, the flow continues to a step S8.

In the step S8, that is, in case the test run waits unsuccessful, an unplanned state exists. This can be signaled with a warning signal WS which differs from the previously described predetermined audio signals TS1, TS2, TS3 for the planned states. Thus, the control device 60 actuates the at least one of the output devices 15, 35, 45 in such a way that the actuated output device(s) 15, 35, 45 acoustically output(s) the warning signal WS. Accordingly, the correspondingly actuated at least one output device 15, 35, 45 acoustically output(s) the warning signal WS. The warning signal WS is, for example, a horn signal, or a buzzer, as described above. Thus, the warning signal WS differs from the previously described predetermined audio signals TS1, TS2, TS3 in that it is a conventional horn signal or signal indicating a disturbance, i.e. no audio signal as described. As a result, the operators 18, 38, 48 of the container handling plant 1 can identify in which state the container handling plant 1 is currently. Thereafter, the flow returns to the step S5.

The method is completed when the container handling plant 1 is turned off or no conversion or refilling the preselected type 111, 112, 311, 312, 313, 411, 412 is effected any more.

The audio signals TS1, TS2, TS3 thus act beyond the respective container handling machine 10, 20, 30, 40 or signal the planned states also for other subsequent container handling machines 10, 20, 30, 40.

Depending on the constellation of the plant 1, such as participating machines 10, 20, 30, 40, spatial separation of the machines 10, 20, 30, 40 or the kind of machine 10, 20, 30, 40, all predetermined audio signals TS1 to TS3 or also only a part of the predetermined audio signals TS1 to TS3 are output or only partially output at the container handling machine 10, 20, 30, 40.

For example, a plant 1 can be constructed with a block (container handling machine 10) having a blowing machine, a labeling machine and a filling machine, and then connected via conveyors with a packaging machine (container handling machine 20) and then connected via conveyors with a palletizer (container handling machine 30) etc. In this example, it may be important to know at the palletizer (container handling machine 30), whether the block (container handling machine 10) has finished production and the setup was started. Therefore, the predetermined audio signal TS2 from the block (container handling machine 10) can then be "mirrored" to the palletizing machine (container handling machine 30)—that is, output at the same time, too. This is advantageous when the palletizing machine (container handling machine 30) is far away and the predetermined audio signal TS2 from the block (container handling machine 10) cannot be heard at the palletizing machine (container handling machine 30). This gives the operator correspondingly more time to prepare the setup/conversion. In this case, or also in the case that the two machines 10, 30 are located close to each other, it may also be advantageous if, for example, the predetermined audio signal TS1 for the container handling machine 10 differs from the predetermined audio signal TS1 for the container handling machine 30.

Of course, other combinations/sequences are conceivable.

Thus, in the method described above, the predetermined audio signal TS1, TS2, TS3 for each planned state of a change of a type 111, 112, 311, 312, 313, 411, 412 or a refill for a type 111, 112, 311, 312, 313, 411, 412 of the container handling plant 1 is preferably different from the other predetermined audio signals TS1, TS2, TS3.

In addition, the control device 60 may actuate, for example, the second output device 35 depending on a type 111, 112 preselected in the type preselection memory 11. Accordingly, the control device can control the second output device 35 in case a change of the type 111, 112 or the refilling for the preselected type 111, 112 is scheduled in the future, for example after 5 minutes, at the first container handling machine 10.

In a first modification of the aforementioned method, at least one of the output devices 15, 35, 45 can be actuated by the control device 60 to output only the second predetermined signal TS2.

In a second modification of the aforementioned method, at least one of the output devices 15, 35, 45 may be configured to periodically repeat the predetermined audio signal TS1, TS2, TS3. Herein, the output of the predetermined audio signal TS1, TS2, TS3 comprises a code comprising the progressing time in relation to the change of a type 111, 112, 311, 312, 313, 411, 412 or the refilling for a type 111, 112, 311, 312, 313, 411, 412. This can be carried out, for example, such that the predetermined audio signal TS1, TS2, TS3 is output once after a quarter of an hour, is output twice in succession after half an hour, is output three times in succession after three quarters of an hour, and is output four times in succession after one hour, etc. It is also possible that the output of the predetermined audio signal TS1, TS2, TS3 is output noticeably faster at the named intervals. It is also possible that the output of the predetermined audio signal TS1, TS2, TS3 additionally comprises, for example, one to four sounds of a. The audio signal TS1 may preferably be coded with a sound of a gong, the audio signal TS2 with 2 sounds of a gong, etc. This serves as an additional distinguishing feature for assigning the signals.

In a third modification of the aforementioned method, the detecting device 70 can detect at least one actual state of an operating variable during operation of the at least one container handling machine 10, 20, 30, 40 in the previously described step S2. Such an operating quantity may in particular be the residual amount or minimum amount of a product in a filler or mixer 5 for the product of the filler, which product is to be mixed and to be filled into the containers 5, or the residual quantity of labels on a label roll, etc. Herein, the actual state of the operating variable is a measurement for a time period, at the end of which is scheduled a start or the end of a predetermined operation of the at least one container handling machine. In this case, the control device 60 can actuate the at least one output device 15, 35, 45 in the step S3 such that the output device 15, 35, 45 outputs the first predetermined audio signal TS1 in case the detection device detects a predetermined actual state of the at least one actual state.

Herein, the start or the end of a predetermined operation of the at least one container handling machine 10, 20, 30, 40 is understood to mean the start or the end of the production performed with the container handling plant 1. Alternatively, the start or the end of a predetermined operation of the at least one container handling machine 10, 20, 30, 40 is understood to mean the start or the end of a conversion of the at least one container handling machine 10, 20, 30, 40 from the production of a first product to a second product. Alternatively, the start or the end of a predetermined operation of the at least one container handling machine 10, 20, 30, 40 is understood to mean the start or the end of a cleaning process performed with the at least one container handling machine 10, 20, 30, 40.

Figure 3:
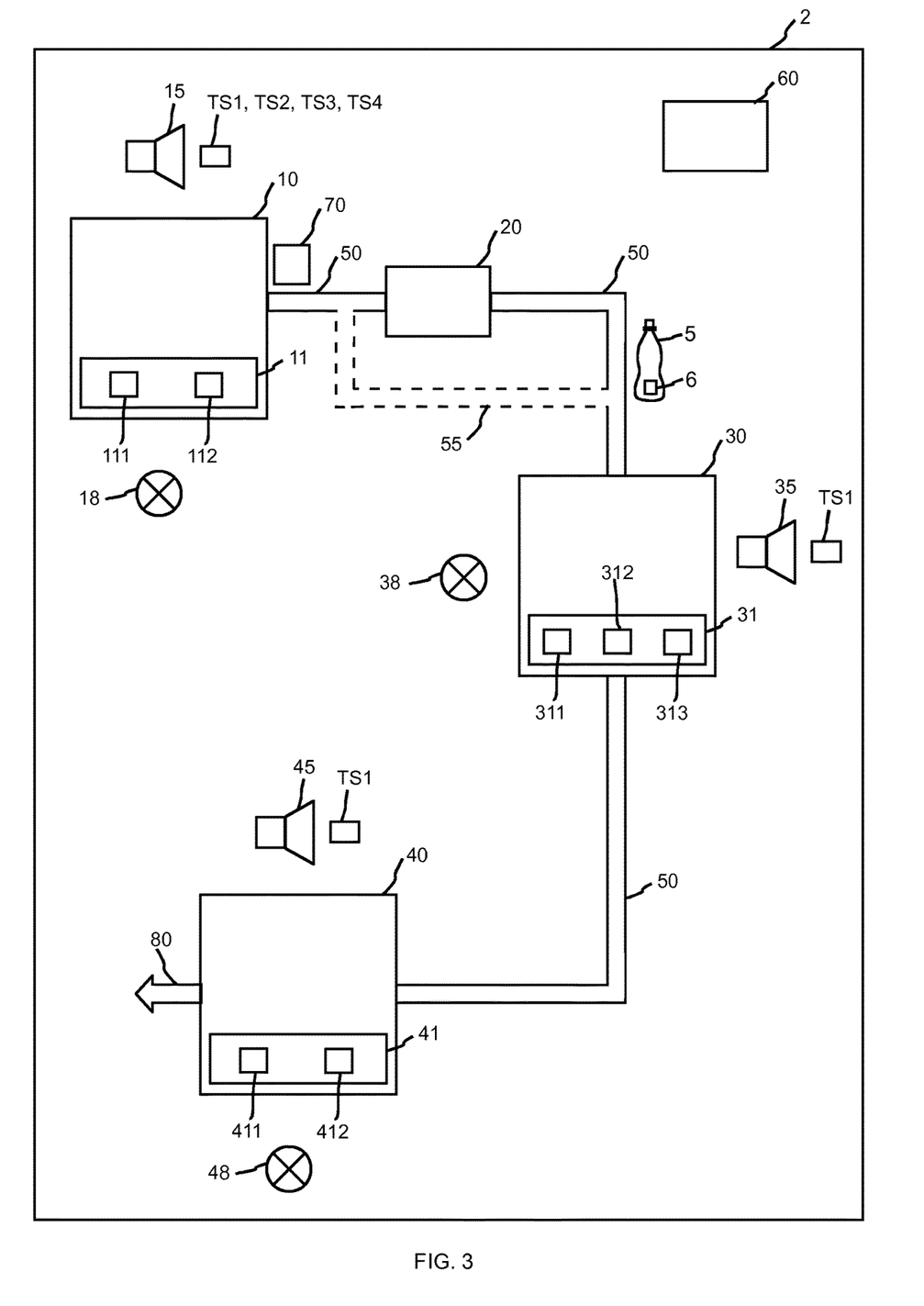
FIG. 3 is a schematic block diagram of a container handling plant according to a second embodiment.

FIG. 3 shows a container handling plant 2 according to a second embodiment. The container handling plant 2 according to the second embodiment is implemented in many aspects like the container handling plant 1 according to the first embodiment. Therefore, only the differences between the two embodiments will be described below.

In contrast to the first embodiment, the container handling plant 2 comprises in the present embodiment a conveying device 55 positioned to bypass the second container handling machine 20. The conveying device 55 can be used in a case in which a type 111 associated to the bypass is selected in the type preselection memory 11 of the first container handling machine 10. After filling of beverages, such a bypass is conceivable, for example, for the case in which a non-pasteurisierendes drink is filled in the container 5 instead of a beverage to be pasteurized. In such a case, pasteurization of the container 5 with a pasteurizer after filling the container is not provided. Likewise, it may be necessary to heat in a warmer, recool or otherwise treat, or even—by bypassing the container handling machine 20—not to treat a filled bottle.

In this way, the handling of the container handling plant 2 can advantageously be adapted to the type 111, 112 which is preselected in the type preselection memory 11 of the first container handling machine 10.

Figure 4:
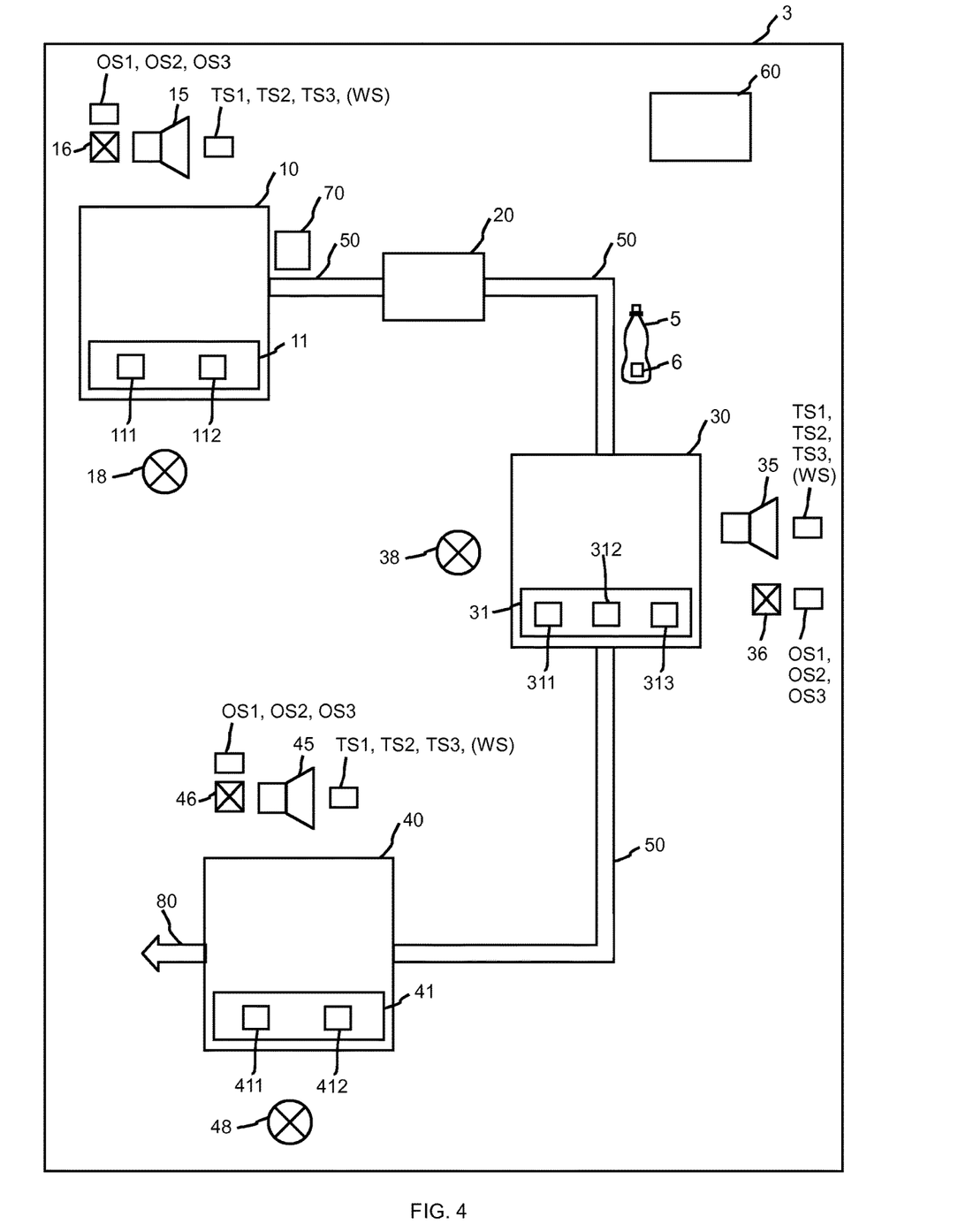
FIG. 4 shows a schematic block diagram of a container handling plant according to a third embodiment.

FIG. 4 shows a container handling plant 3 according to a third embodiment. The container handling plant 2 according to the third embodiment is implemented in many aspects like the container handling plant 1 according to the first embodiment. Therefore, only the differences between the two embodiments will be described below.

In contrast to the first embodiment, the container handling plant 3 comprises alternatively or additionally in the present embodiment a first to third optical output device 16, 36, 46 which are respectively allocated to the individual container handling machines 10, 30, 40, as illustrated in FIG. 4. Each of the first to third optical output devices 16, 36, 46 is configured such that it can output the predetermined optical signals OS1, OS2, OS3 as needed.

In addition, the container handling plant 3 in the present embodiment is preferably a disposable plant. Such a plant produces containers 5 which, once emptied of the product filled therein, are not reused any more for filling with a new product.

Each of the first to third optical output devices 16, 36, 46 can be configured as a very cost effective variant, for example as an indicator lamp. In particular, the indicator lamp may have a color, such as turquoise, pink, etc., which differs from the colors of warning lamps, which as a rule have red or green or yellow or blue as the color. However, it is also possible that at least one of the first to third optical output devices 16, 36, 46, as the most costly variant, is a screen. The at least one first to third optical output device 16, 36, 46 can also be integrated in a screen.

Preferably, the predetermined optical signals OS1, OS2, OS3 are output in parallel with or instead of the predetermined audio signals TS1, TS2, TS3, as described below.

The first predetermined optical signal OS1 indicates in the previously described step S2 that a continuous production is pending at the associated container handling machine 10, 30, 40. In this case, no change of a type 111, 112, 311, 312, 313, 411, 412 or the refilling or operator intervention/setup process for a type 111, 112, 311, 312, 313, 411, 412 is selected on the type preselection memory 11, 31, 41. Thus, the respective operator 18, 38, 48 has to decide, whether a change of a type 111, 112, 311, 312, 313, 411, 412 or refilling or an operator intervention/setup process for a type 111, 112, 311, 312, 313, 411, 412 has to take place. The first predetermined optical signal OS1 is possibly a constant illumination or constant light of an indicator lamp as an optical output device 16, 36, 46.

If the change of a type 111, 112, 311, 312, 313, 411, 412 or refilling or an operator intervention/setup process for a type 111, 112, 311, 312, 313, 411, 412 has to take place, the second predetermined optical signal OS2 is output at step S3 previously described. Consequently, the second predetermined optical signal OS2 signals during ongoing production and already pending change of production at the associated container handling machine 10, 30, 40 (external setup) that a change of a type 111, 112, 311, 312, 313, 411, 412 or the refilling or operator intervention/setup process for a type 111, 112, 311, 312, 313, 411, 412 is to be made soon or something is to be done soon. The second predetermined optical signal OS2 is possibly realized by flashing of an indicator lamp as an optical output device 16, 36, 46. Also, the flashing may become faster as time progresses, as previously described with respect to the first embodiment. Preferably, the flashing is carried out at a frequency of 0.66 Hz, for example, i.e. slower than the flashing for noise.

In the previously described step S5, in which the production at the associated container handling machine 10, 30, 40 ended already and the conversion or refill is performed (internal setup), the second predetermined optical signal OS2 further indicates that the resetting or conversion or refilling is still running or not yet confirmed.

The third predetermined optical signal OS3 indicates that no task is currently pending. For this purpose, the associated output device 16, 36, 46 can be turned off. The third predetermined optical signal OS3 is displayed only when the container handling plant 3 is at a standstill.

In a first modification of the present embodiment, the second predetermined optical signal OS2 is not the same for steps S3 and S5 but differs in the steps S3, S5 by the manner of flashing. The kind of flashing may in particular be the frequency of the flashing, such as fast or slow, or the sequence of flashing, first a long illumination of the associated output device(s) 16, 36, 46, followed by a brief illumination of the associated output device(s) 16, 36, 46, etc. Also in this way, another code can be contained in the second optical signal OS2, wherein the code comprises the progressing time in relation to the change of a type 111, 112, 311, 312, 313, 411, 412 or refilling fora type 111, 112, 311, 312, 313, 411, 412. This has been described in detail as the second modification of the method according to the first embodiment.

In a second modification of the present embodiment, the third predetermined optical signal OS3, which is, for example, no illumination or is the turning off state of the respective output device 16, 36, 46, is output instead of the first predetermined optical signal OS1 which is, for example, constant lighting of the associated output device 16, 36, 46. Also in this way, the handling of the container handling plant 3 can advantageously be selected according to the selection at the respective type preselection memory 11, 31, 41 of the container handling machines 10, 30, 40.

The respective optical signals OS, OS2, OS3 thus also act beyond the respective container handling machine 10, 20, 30, 40 or signal the planned states also for other, subsequent container handling machines 10, 20, 30, 40. Depending on the constellation of the plant 1, such as participating machines 10, 20, 30, 40, spatial separation of the machines 10, 20, 30, 40 or the type of machine 10, 20, 30, 40, all predetermined optical signals OS, OS2, OS3 or only part of the predetermined optical signals OS, OS2, OS3 can be output or can be output only partially at the container handling machines 10, 20, 30, 40. This can be done as previously described in the first embodiment for the predetermined audio signals TS, TS2, TS3.

In a case in which two operators 18 are working (to save time) in an area of the plant 1—a block, for example—for a conversion, for example, one of the operators 18 may immediately identify, whether a subarea was already converted by the other operator 18. This can be identified, for example, since the optical signal no longer flashes there.

All of the above-described implementations of the container handling plants 1, 2, 3, container handling machines 10, 20, 30, 40, the conveying devices 50, 55 the control device 60 and the conveying method described above can be used individually or in all possible combinations thereof. The features of the first to second embodiments and/or the modifications thereof can be combined arbitrarily. Moreover, in particular, the following modifications are conceivable.

The elements shown in the figures are depicted schematically and may differ in the specific implementation from the forms shown in the figures provided that the above-described functions are ensured.

The container handling plants 1 to 3 of the first or second or third embodiment can also be used for the handling of glass bottles or cans.

Also, the container handling plants 1, 2 of the first or second embodiment may be a plant for producing containers for single-use.

In addition, for example, the first container handling machine 10 may have a blowing machine unit, a filling machine unit, a labeling machine unit, etc. arranged directly behind one another in a row, so that the containers 5 can each be conveyed from the preceding machine unit to the following machine unit by means of a conveying device which is not shown.

The number of container handling machines 10, 20, 30, 40 of the container handling plants 1, 2, 3 is arbitrary selectable.

It is also possible that the output devices 15, 16 are implemented as a unit or a component. In addition, the output devices 35, 36 may be implemented as a unit or a component. Still further, the output devices 45, 46 may be implemented as a unit or a component. In these cases, the output devices 15, 35, 45, 16, 36, 46 can output both at least one of the audio signals TS1, TS2, TS3 and at least one of the optical signals OS1, OS2, OS3.

LIST OF REFERENCE SIGNS 1, 2, 3 container handling plant
5 container
6 label
10, 20, 30, 40 container handling machine
11, 31, 41 type preselection memory
15, 35, 45 output device
16, 36, 46 optical output device
18, 38, 48 operator
50, 55 conveying device
60 control device
80 detecting device
80 arrow for discharge direction
111, 112 type
311, 312, 313 type
411, 412 type
S1 to S8 process steps
TS1 first predetermined audio signal
TS2 second predetermined audio signal TS3 third predetermined audio signal
OS1 first predetermined optical signal
OS2 second predetermined optical signal
OS3 third predetermined optical signal
WS fourth predetermined audio signal Having described preferred embodiments of the invention, it will be apparent to those skilled in the art to which this invention relates, that modifications and amendments to various features and items can be effected and yet still come within the general concept of the invention. It is to be understood that all such modifications and amendments are intended to be included within the scope of the present invention.

The invention claimed is:

1. A container handling plant (1; 2; 3), comprising:
   at least one container handling machine (10, 20, 30, 40) for handling containers (5), wherein at least one container handling machine (10, 30, 40) comprises a handling type preselection memory (11, 31, 41) in which different types of handling (111, 112; 311, 312 313; 411, 412) are preselectable for a handling to be performed by the container handling machine (10, 30, 40);
   at least one output device (15, 35, 45; 16, 36, 46) positioned at the at least one container handling machine (10, 30, 40) for outputting an audio signal (TS1, TS2, TS3) and/or an optical signal (OS1, OS2, OS3); and
   a control device (60) configured to control the at least one output device (15, 35, 45, 16, 36, 46) such that the output device acoustically outputs a predetermined audio signal (TS1, TS2, TS3) made of tone sequences comprising at least two different tones and/or optically outputs an optical signal (OS1, OS2, OS 3), if due to the type of handling (111, 112; 311, 312, 313; 411, 412) preselected in the handling type preselection memory (11, 31, 41) a change of a type of handling (111, 112; 311, 312, 313; 411, 412) or a refilling for the preselected type of handling (111, 112; 311, 312, 313; 411, 412) at the container handling machine (10, 20, 30, 40) is scheduled in the future at the end of a predetermined time period.

2. The container handling plant (1; 2; 3) according to claim 1, wherein said predetermined audio signal (TS1, TS2, TS3) is a melody, or wherein said predetermined audio signal (TS1, TS2, TS3) is a melody combined with a speech sequence, and/or wherein the optical signal (OS1, OS2, OS3) is a constant light or a flashing or turning off of the output device (15, 35, 45, 16, 36, 46).

3. The container handling plant (1; 2; 3) according to claim 2, wherein the speech sequence is a spoken speech sequence.

4. The container handling plant (1; 2; 3) according to claim 1, wherein the predetermined audio signal (TS1, TS2, TS3) and/or the optical signal (OS1, OS2, OS3) are/is different for each planned state of a change of a type of handling (111, 112, 311, 312, 313, 411, 412) or refilling or an operator intervention/setup operation for the preselected type of handling (111, 112, 311, 312, 313, 411, 412) of the container handling plant (1), and/or wherein the output device (15, 35, 45; 16, 36, 46) is configured to periodically repeat the predetermined audio signal (TS1, TS2, TS3) and/or the optical signal (OS1, 5 OS2, OS3), wherein the output of the predetermined audio signal (TS1, TS2, TS3) and/or the optical signal comprises a code comprising the progressing time with respect to the change of a type of handling (111, 112; 311, 312, 311, 411, 412) or refilling for the preselected type of handling (111, 112, 311, 312, 313, 411, 412).

5. The container handling plant (1; 2) according to claim 1, wherein an output device (15, 35, 45, 16, 36, 46) is allocated to each container handling machine (10, 30, 40) having a handling type preselection memory (11, 31, 41); and
   wherein the output device (15, 35, 45; 16, 36, 46) of a container handling machine (10, 30, 40) is operable independent of an output device (15, 35, 45) of another container handling machine (10, 30, 40).

6. The container handling plant (1; 2; 3) according to claim 5,
   wherein the container handling plant (1; 2; 3) comprises a first container handling machine (10) and another container handling machine (30) positioned downstream of the first container handling machine (10) in a conveying direction of the containers (5); and
   wherein the control device (60) is configured to controlling an output device (35) positioned at another container handling machine (30) such that the output device (35) outputs the predetermined audio signal (TS1) and/or the optical signal (OS2) when, due to the type of handling (111, 112) preselected in the handling type preselection memory (11), a change of the type of handling (111, 112) or a refill of the preselected type of handling (111, 112) on the first container handling machine (10) is scheduled in the future at the end of a predetermined time period.

7. The container handling plant (1; 2) according to claim 1, further comprising a detecting device (70) configured and positioned to detect at least one actual state of an operating variable in operation of the at least one container handling machine (10, 20, 30, 40), wherein the actual state of the operating variable is a measurement for a time period or a residual amount still to be filled, at the end of which time period is scheduled a start or the end of a predetermined operation of the at least one container handling machine (10, 20, 30, 40),
   wherein the control device (60) is configured to controlling the at least one output device (15, 35, 45; 16, 36, 46) such that the output device (15, 35, 45; 16, 36, 46) outputs an audio signal (TS1, TS2, TS3) from tone sequences comprising at least two different tones and/or the optical signal (OS1, OS2, OS3), when the detecting device (70) detects a predetermined actual state of the at least one actual state.

8. The container handling plant (1; 2) according to claim 7,
   wherein the start or the end of a predetermined operation of the at least one container handling machine (10, 30, 40) is the start or the end of production with the container handling plant (1); or
   wherein the start or the end of a predetermined operation of the at least one container handling machine (10, 20, 30, 40) is the start or the end of a conversion of the at least one container handling machine (10, 30, 40) from the production of a first product to a second product; or
   wherein the start or the end of a predetermined operation of the at least one container handling machine (10, 20, 30, 40) is the start or the end of a cleaning process performed with the at least one container handling machine (20).

9. The container handling plant (1; 2) according to claim 1, further comprising a conveying device (50) for conveying containers (5) to the at least one container handling machine (10, 20, 30, 40) or away from the at least one container handling machine (10, 20, 30, 40); and/or further comprising a conveying device (50) for conveying containers (5) from a first container handling machine (10) to a third container handling machine (30), bypassing a second container handling machine (20) which is positioned between the first and third container handling machines (10, 30), if a type of handling (111, 112; 311, 312, 313; 411, 412) associated with the bypassing is preselected in the type preselection memory (11) of the first container handling machine (10); and/or wherein the at least one container handling machine (10, 20, 30, 40) comprises a blow molding machine and/or a cleaning machine and/or a heat handling machine and/or a filling machine and/or an equipment machine and/or a packaging machine and/or a palletizing machine.

10. A method for a container handling plant (1; 2; 3) comprising at least one container handling machine (10, 20, 30, 40) for handling containers (5), at least one output device (15, 35, 45; 16, 36, 46) positioned at the at least one container handling machine (10, 30, 40), and a control device (60), wherein the at least one container handling machine (10, 30, 40) has a type preselection memory (11, 31, 41) in which different types for a handling are preselectable, which are to be performed by the container handling machine (10, 20, 30, 40), and wherein the method comprises the steps of:

performing a handling of containers (5) with the at least one container handling machine (10, 20, 30, 40), in which a type (111, 112; 311, 312, 313; 411, 412) is preselected out of different types (111, 112; 311, 312, 313; 411, 412) of the type preselection memory (11, 31, 41) and for which a handling is to be performed by the container handling machine (10, 30, 40);

controlling, by a control device (60), the at least one output device (15, 35, 45; 16, 36, 46) such that the output device (15, 35, 45, 16, 36, 46) outputs a predetermined audio signal (TS1, TS2, TS3) made of tone sequences comprising at least two different tones and/or optically outputs an optical signal (OS1, OS2, OS 3), if due to the type (111, 112; 311, 312, 313; 411, 412) preselected in the type preselection memory (11, 31, 41) a change of a type (111, 112; 311, 312, 313; 411, 412) or a refilling for the preselected type (111, 112; 311, 312, 313; 411, 412) at the container handling machine (10, 20, 30, 40) is scheduled in the future at the end of a predetermined time period; and acoustically outputting, by at least one output device (15, 35, 45; 16, 36, 46), the predetermined audio signal (TS1, TS2, TS3) and/or optically outputting, by at least one output device (16, 36, 46), an optical signal (OS1, OS2, OS3).

* * * * *